Jan. 22, 1924. 1,481,370
R. HUFF
WHEEL CONSTRUCTION
Filed Sept. 4, 1920
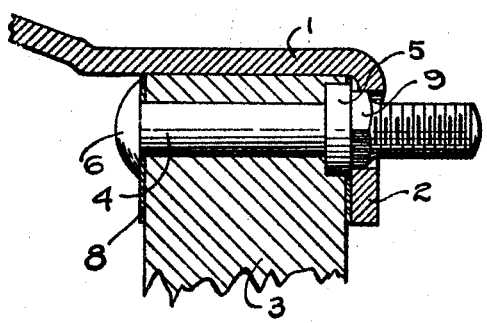
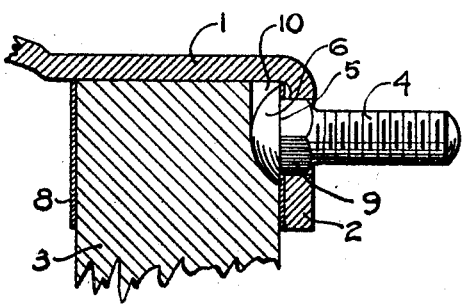
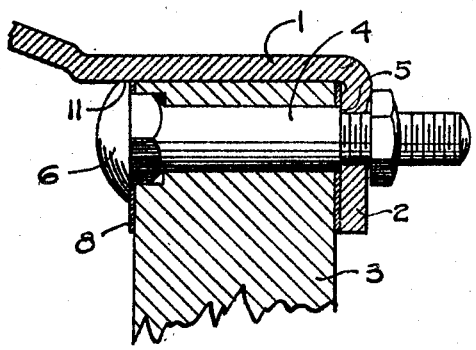
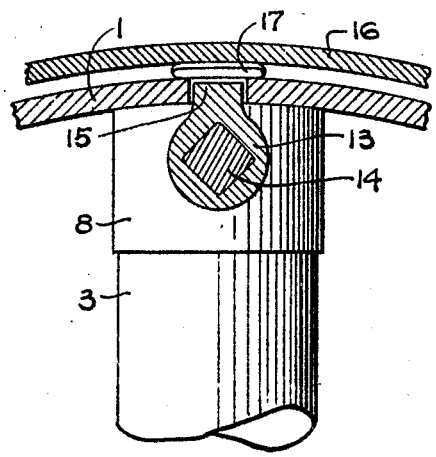
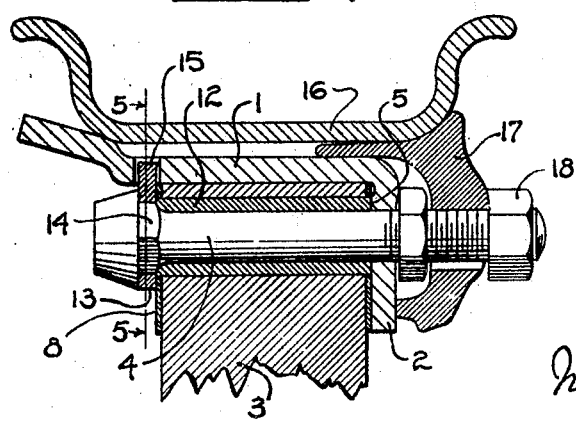
INVENTOR
Russell Huff
BY
Newell and Spence
ATTORNEYS Patented Jan. 22, 1924.                                                      1,481,370

UNITED STATES PATENT OFFICE.

RUSSELL HUFF, OF DETROIT, MICHIGAN, ASSIGNOR TO DODGE BROTHERS, OF DETROIT, MICHIGAN, A CORPORATION OF MICHIGAN.

WHEEL CONSTRUCTION.

Application filed September 4, 1920. Serial No. 408,334.

*To all whom it may concern:*

Be it known that I, RUSSELL HUFF, a citizen of the United States, residing at Detroit, Michigan, have invented certain new and useful Improvements in Wheel Constructions, of which the following is a clear, full, and exact description.

My invention relates to wheel constructions, and especially to wheels of automobiles having metal felloes and wooden spokes. In prior constructions of this general character, the wheel is weakened by reason of the fact that the bolt which passes through the end of the spoke tends to crush the spoke when the nut is tightened to force the rim clamp inwardly, when the tire is put on the wheel. One of the objects of my invention is to so construct the wheel that this crushing tendency of the spoke is avoided. Other objects and advantages will be apparent from the following detailed description and claims when taken in connection with the accompanying drawings, which drawings indicate several ways in which my invention may be carried out in practice. In said drawings Fig. 1 represents a sectional view of one form of my invention;

Fig. 2 a sectional view of another form in which the bolt does not pass through the end of the spoke, but bears against the inside of a ferrule, carried by the spoke;

Fig. 3 is a sectional view of still another form of construction;

Fig. 4 is a sectional view of still another form; and

Fig. 5 is a section on the line 5—5 of Fig. 4.

Referring to the drawings, 1 indicates a felloe, which may be of usual form and is preferably constructed of steel. As is usual, the felloe has a flange portion 2 overlying the ends of the spokes 3, said flange having a hole therein through which passes a bolt 4. In the form of construction shown in Fig. 1, the bolt is provided with a shoulder 5, which bears against the inside of the flange 2, so that when the nut is screwed on the bolt, said bolt and felloe are clamped together. In this form of construction the bolt is passed through the spoke before it is headed, the head 6 being subsequently formed in any suitable manner. This head also forms a shoulder which bears against the spoke on the side opposite that of the shoulder 5, and the distance between the two shoulders is substantially equal to the diameter of the spoke at that portion thereof through which the bolt passes, so that no matter how tightly the nut is screwed on to the bolt there is no crushing effect of the bolt head against the spoke. Preferably, a ferrule 8 encircles the end of the spoke, and the shoulder formed by the head of the bolt may bear against this ferrule. It is, of course, understood that a washer may be provided against which the bolt head bears instead of a ferrule, if desired, although a ferrule is preferred. Rotation of the bolt is prevented by forming a squared portion 9 on the bolt which fits a hole in the flange of the felloe, as will be readily understood.

In the construction shown in Fig. 2, the bolt does not pass entirely through the spoke, but the shouldered head portion 5 engages the inside of the ferrule as shown. In order to assemble the parts, a notch is made in the end of the spoke as indicated at 10. Rotation of the bolt is prevented as in the previous construction by the squared portion 9.

The construction shown in Fig. 3 is somewhat similar to that shown in Fig. 1, except that the bolt may be formed complete before being inserted into the spoke, since the shoulder 5 is formed by reducing the diameter of the bolt at this point as shown. In this form of construction, rotation of the bolt is prevented by having the head somewhat larger than that of the bolt shown in Fig. 1, and flattening the head somewhat, as shown at 11 in Fig. 3.

In Fig. 4, the construction is similar to that of Fig. 3, except that a metal sleeve 12 is provided, which is inserted in the hole in the spoke. The means for preventing rotation of the bolt consists of a dog 13, which has a square hole fitting on a square portion of the bolt as shown at 14, Fig. 5, this dog having a portion 15 engaging a slot in the felloe. In Fig. 5 a tire rim 16 is also shown, as well as the rim clamp 17 with its nut 18. It will, of course, be understood that these parts are used in conjunction with those parts already described, in the constructions shown in Figs. 1 to 3.

While I have described a number of forms in which my invention may be embodied, it is to be understood that it may be otherwise varied without departing from the spirit thereof.

Having thus described my invention, what I claim as new and desire to secure by Letters Patent is:

1. In a wheel, the combination with a metal felloe and a wooden spoke, said felloe adapted to support a tire rim, of a bolt, and means cooperating with said bolt for securing the spoke and the rim to the felloe, said securing means so constructed and arranged that no crushing pressure is exerted on the spoke.

2. In a wheel, the combination with a metal felloe and a wooden spoke, said felloe having a flange and adapted to support a tire rim, of a bolt, said bolt having a shoulder adjacent to and inside said felloe flange whereby said bolt and felloe may be clamped together while no crushing pressure is exerted on the spoke.

3. In a wheel, the combination with a metal felloe and a wooden spoke, said felloe having a flange and adapted to support a wheel rim, of a bolt, said bolt having a shoulder adjacent to and inside said felloe flange whereby said bolt and felloe may be clamped together while no crushing pressure is exerted on the spoke, and means for securing a rim to said felloe through the medium of said bolt.

4. In a wheel, the combination with a metal felloe and a wooden spoke, said felloe adapted to support a tire rim, of a bolt, and means cooperating therewith for securing the spoke and rim to the felloe, said means so constructed and arranged that no crushing action is exerted by the bolt on the spoke while permitting varying pressure to be applied to secure the rim to the felloe.

5. In a wheel, the combination with a metal felloe and a wooden spoke, said felloe adapted to support a tire rim by the usual rim clamps, of a bolt constructed to unite the felloe and spoke with constant pressure while permitting varying pressure to be exerted on the rim clamp to secure the rim to the felloe.

6. In a wheel, the combination with a metal felloe and a wooden spoke, of a bolt engaging but not clamping a spoke, said bolt passing through the felloe and adapted to be clamped thereto.

7. In a wheel, the combination with a metal felloe and a wooden spoke, said felloe adapted to support a wheel rim, of a bolt adapted to receive means for clamping it to the felloe and to the rim, said bolt constructed to engage a spoke and unite it with the felloe without exerting any clamping or crushing action thereon.

8. In a wheel having a metal felloe and wooden spokes, said felloe having a flange against which the rim of a detachable tire may seat and a vertical flange extending alongside of said spokes, of means for securing the felloe and rim to the spokes, comprising a bolt having a shouldered portion engaging the inside of said vertical flange, said bolt being of sufficient length to receive the usual tire clamp and nut for securing the rim to the felloe.

9. In a wheel having a metal felloe and wooden spokes, said felloe having a flange against which the rim of a detachable tire may seat and a vertical flange extending alongside of said spokes, of means for securing the felloe to the spokes, comprising a bolt engaging each spoke, such bolt having spaced shoulders one engaging the outside of the spoke and the other the inside of said flange, and a nut engaging the outside of said flange, said shoulders being so spaced that no crushing pressure is exerted on the spoke when the nut is fully seated, said bolt being of sufficient length to receive the usual tire clamp and nut for securing the tire rim to the felloe.

Signed at Detroit, Michigan, this 30th day of August, 1920.

RUSSELL HUFF.

Witnesses:
Wm. E. Shoemaker,
Alfred H. Knight.